United States Patent [19]

Hoekstra

[11] Patent Number: 5,905,862
[45] Date of Patent: May 18, 1999

[54] AUTOMATIC WEB SITE REGISTRATION WITH MULTIPLE SEARCH ENGINES

[75] Inventor: Matthew Hoekstra, Hillsboro, Oreg.

[73] Assignee: Intel Corporation, Santa Clara, Calif.

[21] Appl. No.: 08/707,667

[22] Filed: Sep. 4, 1996

[51] Int. Cl.[6] .................................................. G06F 17/30
[52] U.S. Cl. ................... 395/200.32; 395/200.3; 395/200.33; 395/200.36; 395/200.47; 395/200.58; 395/200.59; 707/4; 707/9; 707/10; 707/104
[58] Field of Search ............ 395/200.3–200.33, 395/200.36, 200.46–200.49, 200.57–200.59; 707/101–104, 1–5, 9–10

[56] References Cited

U.S. PATENT DOCUMENTS

| | | | |
|---|---|---|---|
| 5,329,619 | 7/1994 | Page et al. | 395/200.33 |
| 5,530,852 | 6/1996 | Meske, Jr. et al. | 395/200.36 |
| 5,659,732 | 8/1997 | Kirsch | 707/5 |
| 5,678,041 | 10/1997 | Baker et al. | 395/200.59 |
| 5,727,156 | 3/1998 | Herr-Hoyman et al. | 395/200.49 |
| 5,737,734 | 4/1998 | Schaltz | 707/5 |
| 5,754,938 | 5/1998 | Herz et al. | 395/200.49 |
| 5,787,435 | 7/1998 | Burrows | 707/102 |
| 5,819,271 | 10/1998 | Mahoney et al. | 707/9 |
| 5,826,258 | 10/1998 | Gupta et al. | 707/4 |
| 5,832,497 | 11/1998 | Taylor | 707/104 |

*Primary Examiner*—Zarni Maung
*Assistant Examiner*—Bharat Barot
*Attorney, Agent, or Firm*—William H. Murray; N. Stephan Kinsella

[57] ABSTRACT

A method, apparatus, and storage medium for registering a first application with one or more task applications. According to one embodiment, a set of first application characterization data is provided. Map data for the one or more task applications is stored in a database. The set of first application characterization data is mapped, in accordance with the map data, into a mapped set of first application data for each of the one or more task applications.

20 Claims, 5 Drawing Sheets

400

AUTOMATIC WEB SITE REGISTRATION WITH MULTIPLE SEARCH ENGINES

BACKGROUND OF THE INVENTION

1. Field of the Invention

The present invention relates to computer networks and, in particular, to registration of web sites with multiple search engines on a network such as the world-wide web.

2. Description of the Related Art

In computer network systems such as local-area networks ("LANs"), wide-area networks ("WANs"), and the Internet and the world wide web ("WWW") which operates thereon, large numbers of servers are established on nodes of the network. Such servers are used for many purposes. For example, such servers may be WWW hyper text transport protocol ("HTTP") compatible servers that serve information through the use of web pages to users (often known as browsers) using other servers on the network. A server is typically an application running on a computer-based processor, that provides for access to and communication over the network.

The WWW is a distributed set of machines and applications, characterized by a set of protocols operating on top of the backbone of the Internet, and allows a graphical interface system to operate thereon for accessing information through the Internet. The WWW's protocol, WWW HTTP, runs on top of the Internet's transmission control protocol/Internet protocol ("TCP/IP").

Web sites (also known as web pages or home pages) on the WWW are typically built using the hyper-text markup language ("HTML"), which allows uniform resource locators ("URLs") to be embedded into the script that is used to build pages of such sites. URLs are unique addresses for servers (or for web pages running on servers) on the network, which provide a complete HTTP resource path. URLs thus serve as hypertext links that a browser of the page may select to access further web pages, either on the same server or on other servers of the WWW.

A web browser is an application running on a node of a network that, in WWW-compatible type network systems, allows users of a particular server to view available information and thus allows the user to search graphical and text-based files that are linked together using hypertext links embedded in documents or files. Such documents are typically available from servers on the network that understand HTTP. When a given web page of a server is retrieved by a user using another server, the document retrieved may have various hypertext links embedded therein and a local copy of the page is created local to the retrieving user. Thus, when the user clicks on a hypertext link, the locally-stored information related to the selected hypertext link is typically sufficient to allow the user's machine to open a connection across the Internet to the server indicated by the hypertext link and its associated URL.

For one user of a server of a network to be able to access other servers of the network, the other servers' addresses, which are URLs, must be known. In particular, to be able to access or browse an existing web site, a user must know of the site's existence and URL. One of the problems that has arisen related to use of the WWW is the location of information and web sites of interest. Because of the vast size and decentralized nature of the Internet and WWW, it can be difficult to locate web sites relating to a particular subject, or to learn of their existence.

In response to this problem, various web sites contain servers with search engines that allow browsers to search for various locations on the WWW that are related to particular subjects of interest to the user. Some current search engines include Yahoo!™ and AltaVista™, whose URLs are, respectively: "www.yahoo.com" and "www.altavista.digital.com". A typical search engine may present data in, for example, a hierarchical, organized way; with an index or table of contents; or in response to a search query containing various keywords. These and other ways of providing information to the browser may be considered means for providing for a user to search for web sites of interest on the WWW. These search engines typically maintain a large database with information matching various web sites to various subjects or associated topics. Thus, the database may be searched by keyword or presented in other organized ways to users.

Because of the decentralized nature of the Internet and WWW, and because new sites may be added at any time, it can be difficult for search engines to develop and maintain an accurate, up-to-date database of existing web sites. For this reason, many search engines allow web sites to be "registered" with the search engine. The more web sites that register with the search engine, the more attractive the search engine becomes to potential users. Conversely, a web site owner also has an interest in being registered with as many search engines as possible.

For example, for the Great Chips company to register its web site, "www.great_chips.com", with the Nifty Search Engine company, having an URL of "www.nifty_search_engine.com", the great chips.com web site manager can provide information characterizing the web site to Nifty Search Engine, which can then add this information to its database. Users subsequently using the Nifty Search Engine can be made aware of Great Chips' web site in response to an appropriate search query, for instance.

A web site may be registered with a given search engine, typically, by supplying various pre-defined types of information characterizing their web site. For example, there may be name-value fields for a company's name, address, contact information, web site name, description field, and the like. For each web site registered, one or more descriptions can typically be selected from a pre-defined list of categories and/or subcategories defined for each search engine, such as "entertainment," "entertainment: video games," "engineering," "books," "hobbies: beads," "hobbies: magic," and the like. The proper selection from these categories and other information entered in various fields helps a search engine locate the web site in response to queries, or otherwise helps the search engine to properly categorize the web site.

Site managers or owners are often interested in registering their web sites with a large number of search engines to maximize the visibility of their web site to those using search engines. Unfortunately, it can be difficult to maintain an up-to-date, accurate registration with a large number of search engines, for a variety of reasons. There are currently estimated to be hundreds of search engines on the Internet. Each search engine typically has a unique data format, as well as a unique method of registering. For example, some search engines require registration by a user filling out an HTML form accessed from the search engine's web site, whereas some require registration by emailing a specially-formatted email message to the search engine at its email address. Further, the number and type of information fields and pre-defined categories can be different from one search engine to another. Thus, it can be difficult for a web site to be registered with a large number of search engines due to their large number, differences in the registration process, and differences in the types of information needed for registration with a particular search engine.

Additionally, new search engines can be added, and established search engines can change their registration or database format, requiring further registration or re-registration. Finally, aspects of the web site itself may change or require different emphasis in the way it is registered with search engines, which can require re-registering with all currently-registered search engines as well as registering with additional search engines.

One additional problem is that users may be relatively new to computer applications and may have difficulty registering with a strangely-formatted registration page of a search engine, or with learning to register with multiple search engines.

It is accordingly an object of this invention to overcome the disadvantages and drawbacks of the known art and to provide improved methods and apparatuses for registering web sites with search engines.

Further objects and advantages of this invention will become apparent from the detailed description which follows.

SUMMARY

Embodiments in accordance with the present invention comprise, respectively, a method, an apparatus, or a storage medium encoded with computer-readable computer program code for registering a first application with one or more task applications. According to one embodiment of the invention, a set of first application characterization data is provided. Map data for the one or more task applications is stored in a database. The set of first application characterization data is mapped, in accordance with the map data, into a mapped set of first application data for each of the one or more task applications.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
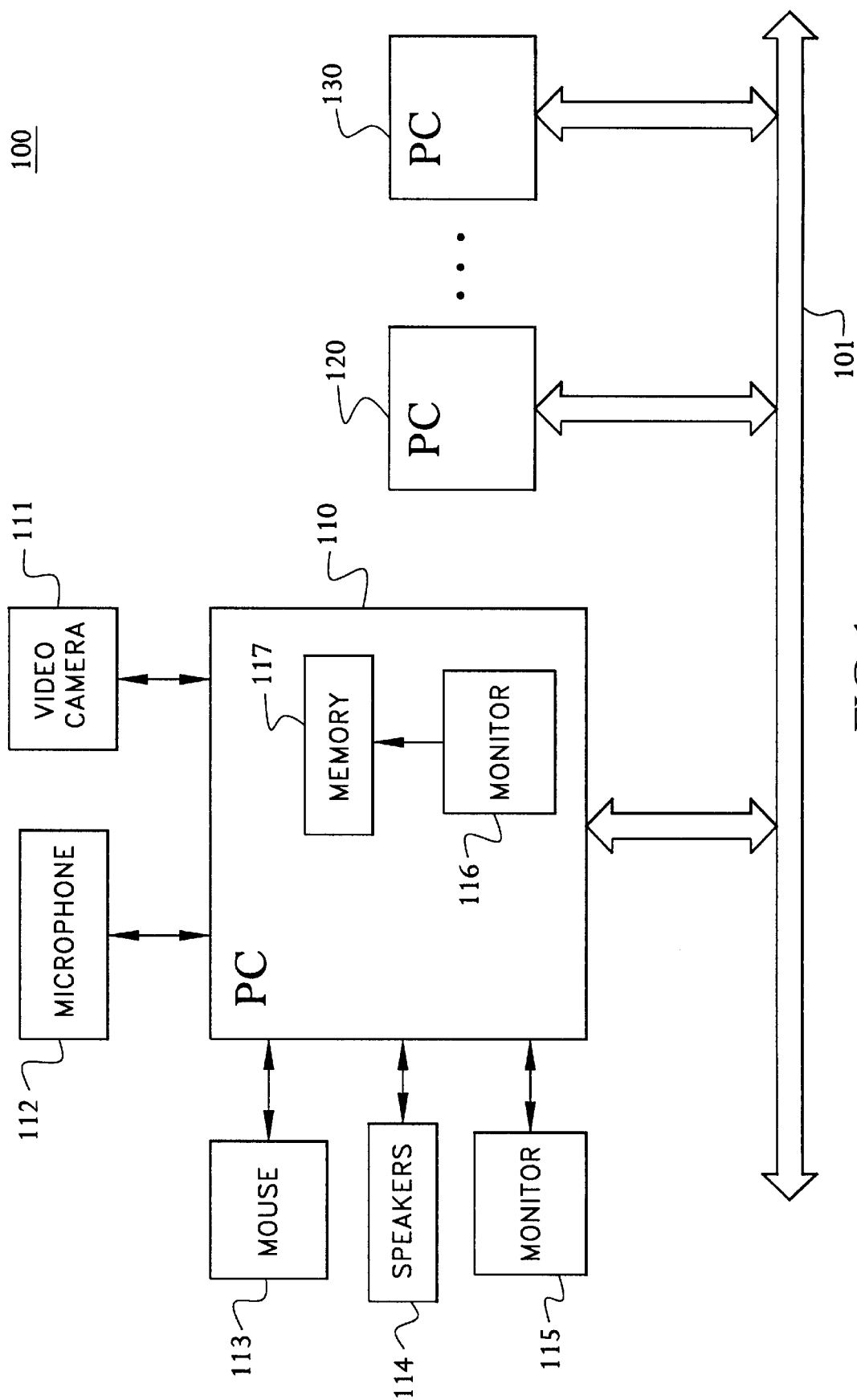
FIG. 1 shows a networked computer system in accordance with a preferred embodiment of the present invention.

Referring now to FIG. 1, there is shown networked computer system 100, in accordance with a preferred embodiment of the present invention. Networked computer system 100 comprises a plurality of nodes or personal computers ("PCs") 110, 120, 130. Personal computer or node 110 comprises a processor 116, memory 117, video camera 111, microphone 112, mouse 113, speakers 114, and monitor 115. PCs 110, 120, 130 may each run one or more desktop servers of an internal network within a given company, for instance, or may be servers of a general network not limited to a specific environment, such as the Internet. For purposes of the present application, it will be assumed that there is one server per PC node of the network, so that each PC node of the network represents a particular network server, having a particular network URL address.

Nodes 110, 120, 130 and other nodes of the network are interconnected via medium 101. In one embodiment, medium 101 is a communications network such as the Internet. As will be appreciated, each server on a network (running from a particular node of the network at a given instance), as well as each web site running on a server, has a unique address or identification within the network, which may be specifiable in terms of an URL.

Processor 116 is, in one embodiment, a general-purpose programmable processor, such as an Intel® Pentium® processor. Those skilled in the art will also appreciate that processors of nodes of networked computer system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110, as will also be understood. It will further be understood that a node may be implemented on any suitable computer system in addition to PC systems.

Figure 2:
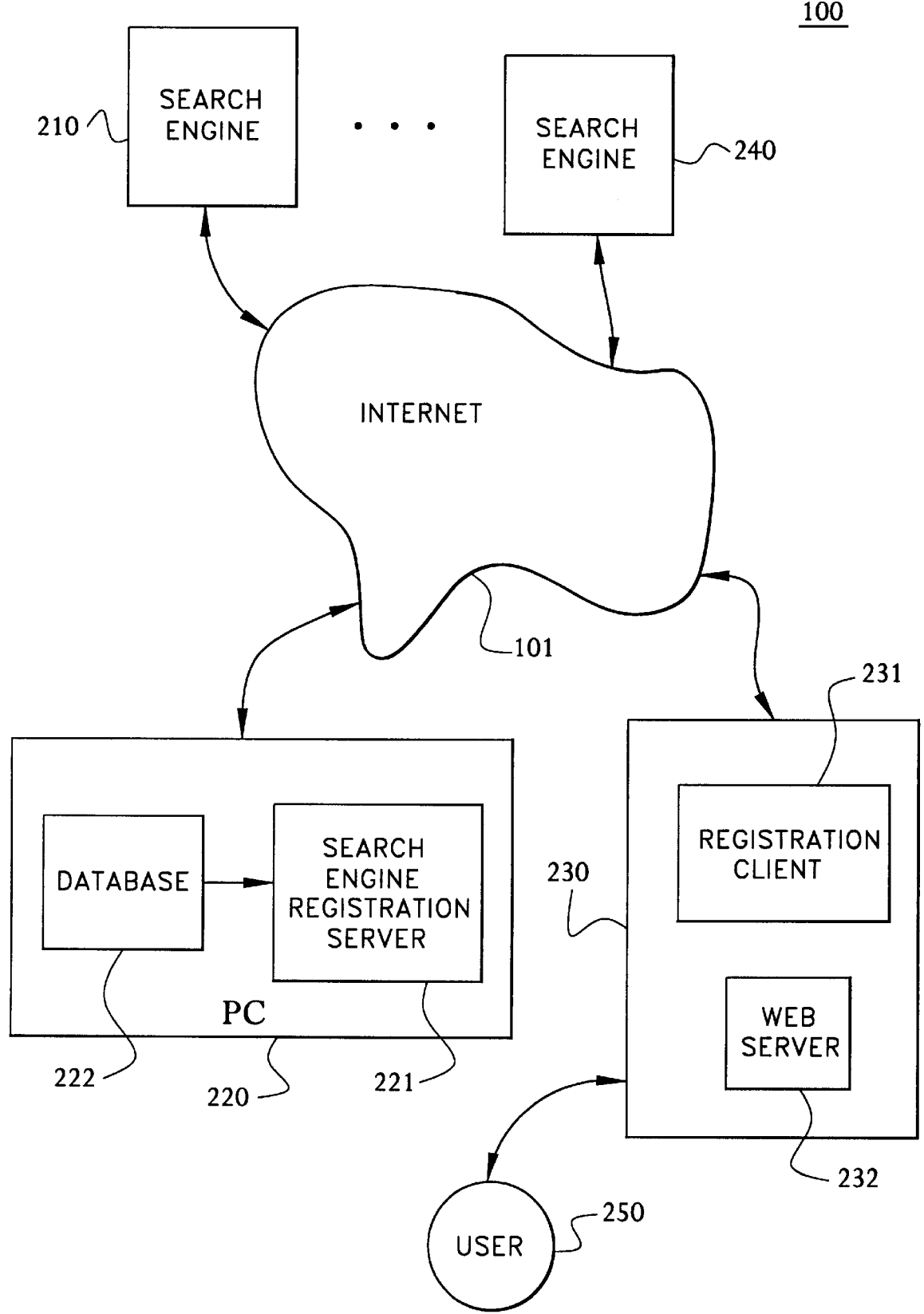
FIG. 2 illustrates further elements of the networked computer system of FIG. 1.

Referring now to FIG. 2, further elements of system 100 are depicted, with emphasis on servers and search engines of the system. As illustrated, search engines 210 and 240 as well as search engine registration server 221 and registration client ("client") 231 are coupled to the Internet. As will be understood, client 231 is also a server. Registration server 221 is provided by PC 220, and client 231 and web server 232 are provided by PC 230. As will be appreciated, these PCs may be configured as illustrated in FIG. 1. For example, PC 220 may be PC 110 of FIG. 1. Similarly, search engines 210 and 240 are provided by servers provided by computers (not shown). A human user 250 is able to operate PC 230 and thereby access its client 231 and web server 232. As will be appreciated, web server 232 may be utilized to provide a web site for user 250.

Search Engine Registration Database

In the present invention, registration server 221 is configured to provide a means for automatically registering a given web site, such as the web site provided by web server 232, with a number of search engines, such as search engines 210, 240. For example, user 250 of PC 230 may utilize PC 230 to both provide web server 232 and to provide for client 231 to allow him to invoke the automatic search engine registration of registration server 221. In one embodiment, user 250 requests client 231 to register the web site of web server 232 with one or more search engines. User 250 fills out a local HTML form with a set of information characterizing the web site of web server 232. This information may be referred to as site characterization data. The site characterization data information is then transmitted to PC 220, for example by way of Internet 101, and stored in database 222.

The site characterization data for the web site may be received from user 250 by any suitable means. In one embodiment, user 250 requests to register the web site of web server 232. This causes client 231 to transmit a registration request via Internet 101 to registration server 221, which then transmits an appropriate HTML form to client 231. This HTML form contains various name-value pair fields that user 250 fills in with the appropriate data. Once the HTML form is completed, the HTML form containing site characterization data for the web site is transmitted via Internet 101 to registration server 221, which stores the information in database 222. From this point, registration server 221 can automatically register with search engines, using the data already provided and stored.

Alternatively, rather than user 250 filling in the appropriate data in the HTML form, some or all of this data may be generated automatically, for example by some application running on PC 230. For example, user 250's name and related information may already be stored locally to PC 230, as well as the URL for the web site. These, in one embodiment, may automatically be entered into the appropriate fields in the HTML form. In another embodiment, rather than requesting the HTML form from registration server 221, the form may already be stored locally to PC 321. In yet another embodiment, a data entry and transmittal technique other than HTML forms may be utilized to collect and transmit site characterization data to registration server 221.

Database 222 also contains a set of information for each of a plurality of search engines, such as search engines 210 and 240, which allows the site characterization data for a particular web site to be mapped into the appropriate categories for each search engine that the site is to be registered with. Registration server 221 thus performs these mappings and uses these mappings to automatically register the web site with each selected search engine. Registration server 221 registers with each search engine with data mapped to the search engine's particular data requirements, and also registers in accordance with the registration method required by the search engine, e.g. by HTML form, by email, regular mail, and the like.

Figure 3:
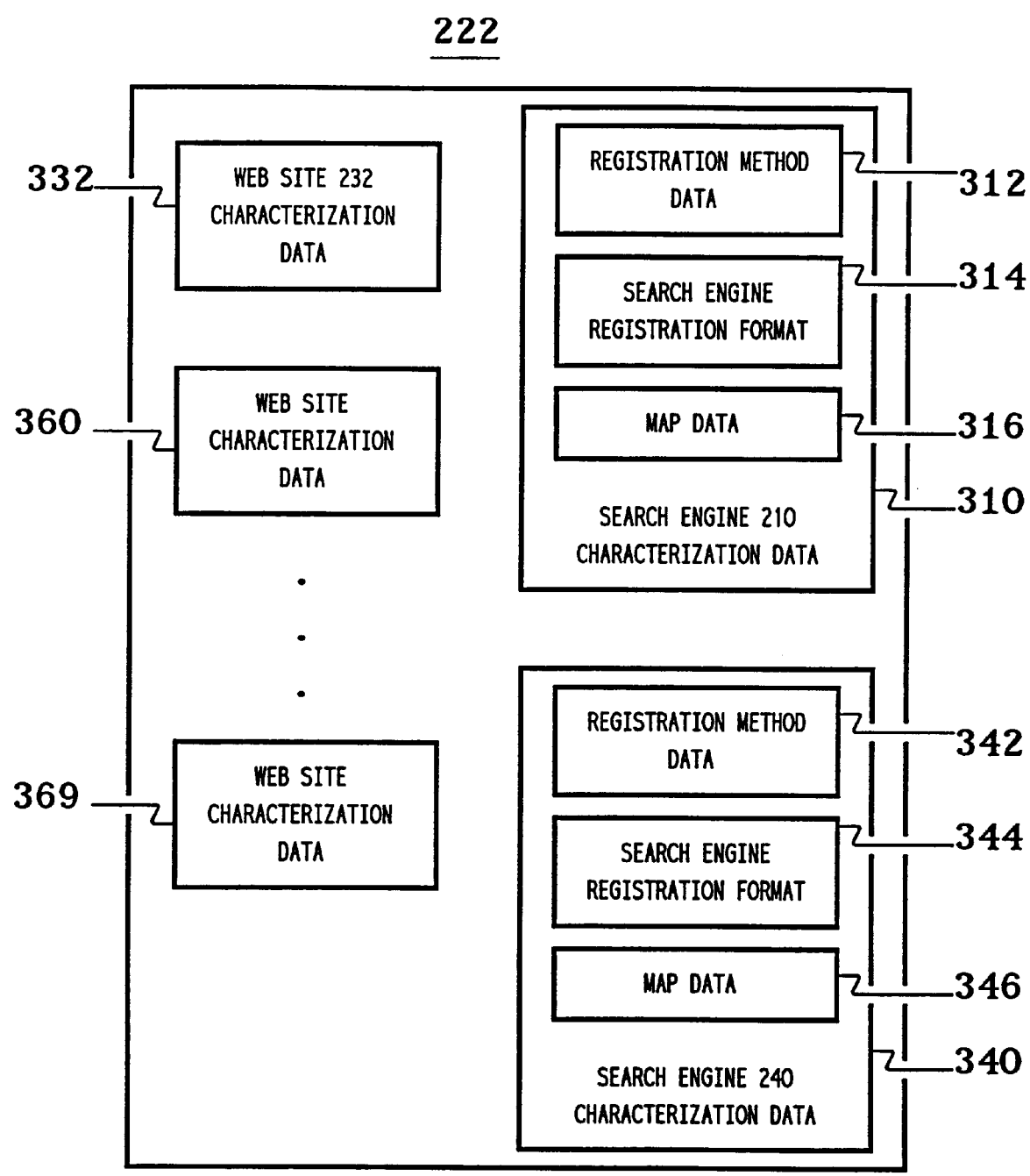
FIG. 3 illustrates the database of the search engine registration server of FIG. 2 in further detail.

Referring now to FIG. 3, there is shown database 222 of registration server 221 in further detail. As illustrated, database 222 stores site characterization data 332, which contains information describing the web site provided by web server 232, as well as search engine characterization data fields 310 and 340, which contain information characterizing search engines 210 and 240, respectively. Each of data fields 310 comprises registration method data 312, 342, and search engine registration format 314, 344, respectively. For example, registration method data 312 contains information that allows registration server 221 to know the method of registration required by search engine 210, such as whether HTML form registration, email registration, or another form of registration is required to register a web site with search engine 210. Each search engine characterization data field also contains a map data field 316, 346, as illustrated. The map data field 316, 346 for each search engine describes how fields from site characterization data are to be mapped into the corresponding fields of each search engine (which fields are themselves described in the search engine registration format fields 314, 344). As will be understood, given data about a particular search engine's registration format, the mapping for each search engine may be prepared ahead of time. In one embodiment, a human user prepares this mapping by mapping site characterization data fields into the best corresponding search engine data fields.

Each search engine registration format information describes the types of information required by the respective search engine for registration with that search engine. As will be appreciated, database 222 may store multiple site characterization data fields other than the web site of web server 232, such as site characterization data fields 360 to 369, and may store any number of search engine characterization data fields for additional search engines (not shown). Further, as will be understood, in alternative embodiments, database 222 and search engine characterization data fields 310, 340 may store the above-described data in alternative data formats. For example, rather than store both a search engine registration format field 314, 344 and map data field 316, 346, the former fields may be omitted or combined with the map data fields.

Category and Data Mapping

Figure 4:
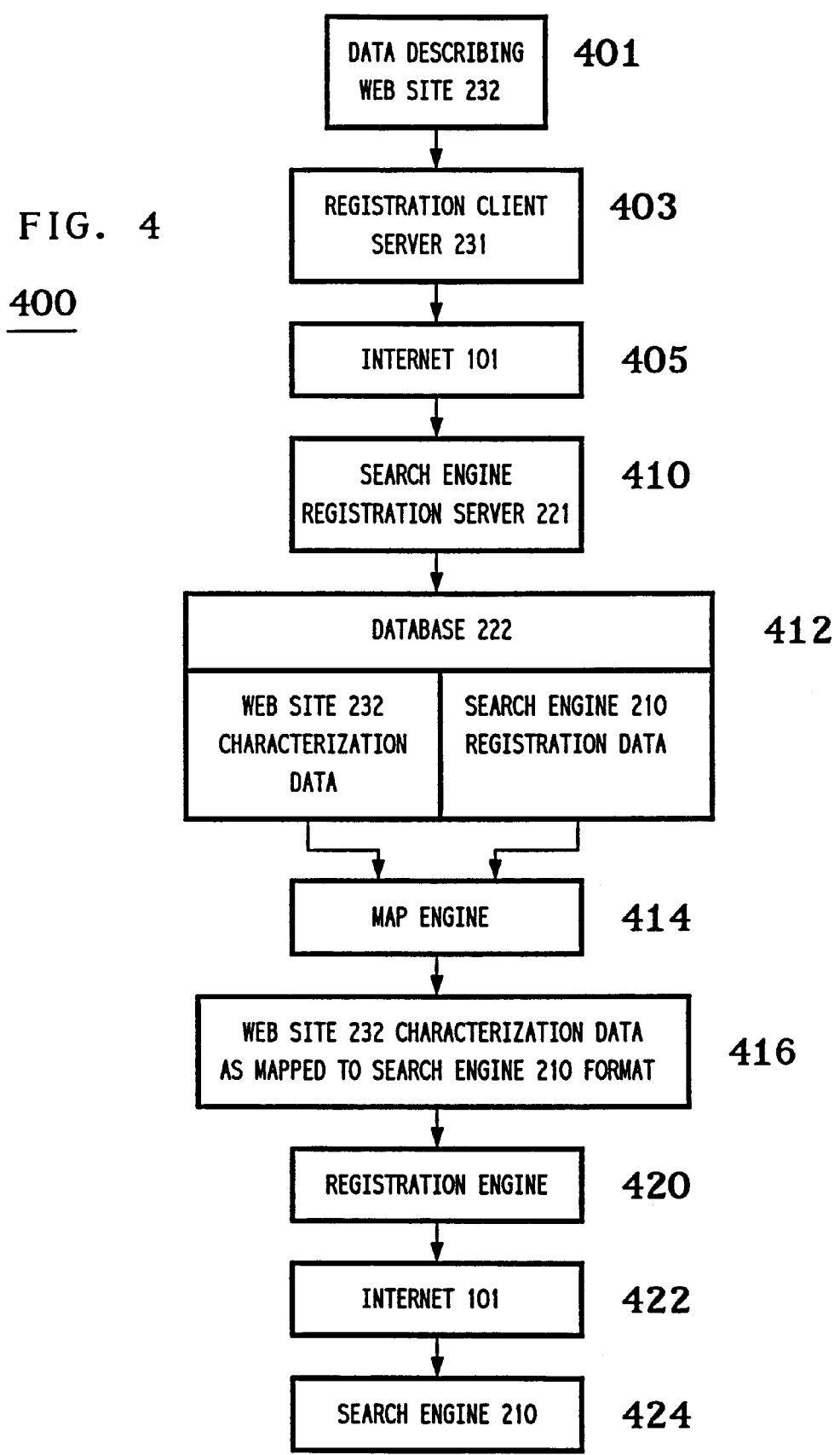
FIG. 4 is a flow chart illustrating the method of operation of and data flow in the networked computer system of FIGS. 1 and 2.

Referring now to FIG. 4, there is shown flow chart 400 illustrating the method of operation of and data flow in networked computer system 100 of FIGS. 1 and 2. In the following example, the web site provided by web server 232 is registered with search engine 210. As illustrated, in step 401, data describing the web site is collected and prepared, for example by user 250. This information is then transmitted to client 231 (step 403). Client 231 then transmits this information to registration server 221 via internet 101 (steps 405, 410). Registration server 221 then stores this information as web site characterization data in field 332 of database 222 (step 412).

A map engine 414 then uses search engine 210 registration format data 314, which is stored in database 222, to map web site characterization data into the types of categories and data formats required by search engine 210 (steps 414–416). A registration engine 420 then, in accordance with search engine 210 registration method data 312, utilizes this mapped data to register with search engine 210. Steps 414 to 424 may be repeated for registration with additional search engines.

As will be appreciated, map engine 414 and registration engine 420 may be implemented as applications running on a processor (not shown) of PC 220, either invoked by or a part of registration server 221, which is itself an application running on a processor (not shown) of PC 220.

Figure 5:
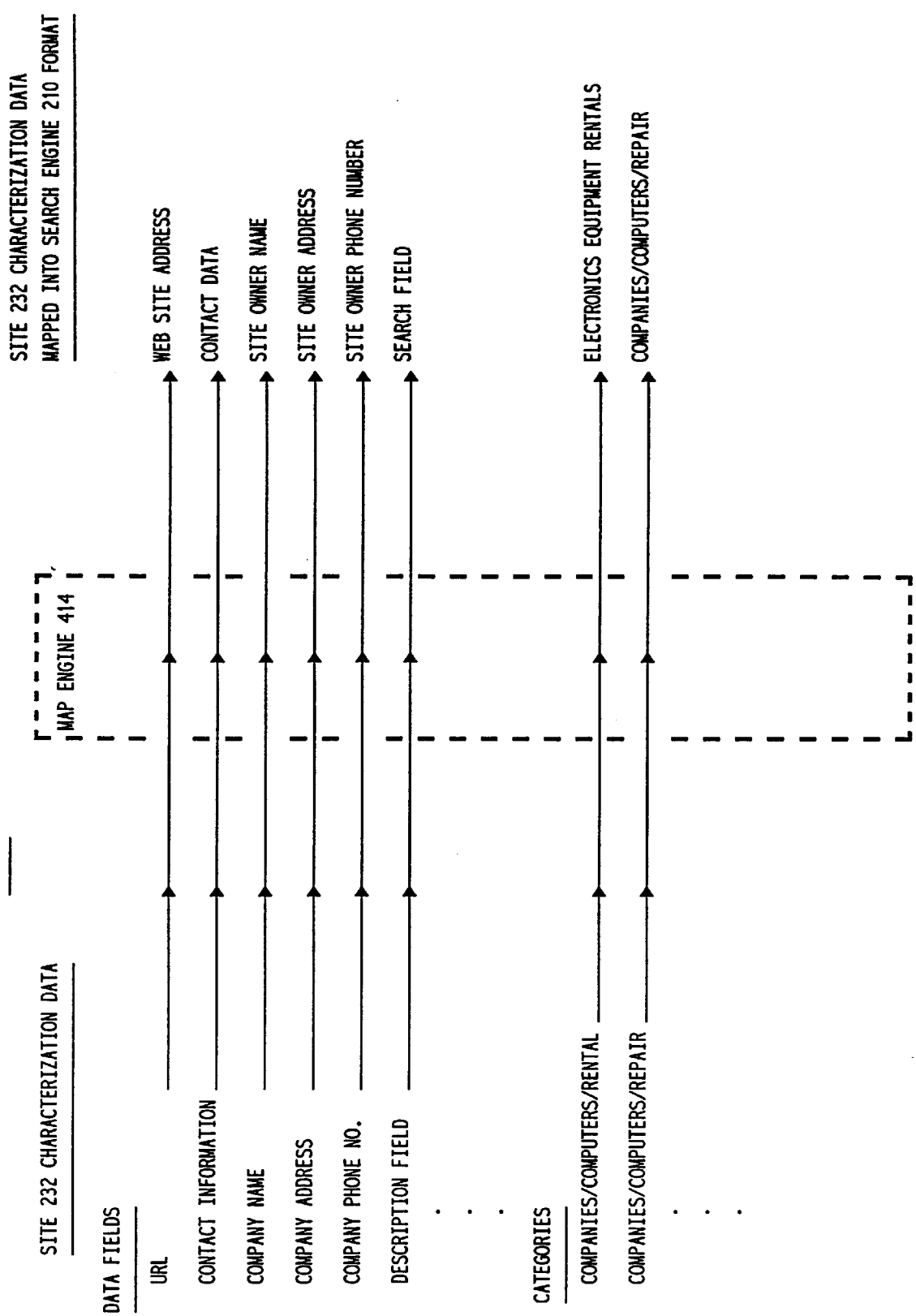
FIG. 5 illustrates an exemplary mapping of site characterization data in accordance with the networked computer system of FIGS. 1 and 2.

Referring now to FIG. 5, there is shown an exemplary mapping 500 by map engine 414 of site characterization data in accordance with the networked computer system 100 of FIGS. 1 and 2. Mapping 500 corresponds to steps 414-416 of FIG. 4. As will be appreciated, site characterization data for the web site of web server 232 is stored in accordance with a plurality of name-value fields. In a name-value field, a field of a given name stores a particular value. For example, the field named "URL" would contain a value equal to the exact text string URL for the web site. Thus, user 250 enters data to fill in the values for all the name-value fields as specified in the HTML form filled out at the beginning of the registration process.

As will be appreciated, the web site is characterized by site characterization data, in accordance with a plurality of name-value fields designed to adequately describe various parameters and aspects of any given web site. In one embodiment, site characterization data is configured so as to maximize the ability to accurately map this data into the types of data required by most search engines. For example, most or all search engines will require the web site's name, as well as contact information and the like. Thus, in one embodiment, the site characterization data stored in database 222 contains as many data fields as possible that are common to a large number of search engines. As will be understood, because search engines have similar purposes, there are typically a large number of common data field types in common that make it possible to have one set of site characterization data, which is mappable into each of the search engine's registration formats.

Many search engines, in addition to requiring data in various data fields, also allow or require the web site to select one or more categories from a pre-defined list of categories, that helps to describe the web site. For example, such categories and/or subcategories may include "entertainment," "entertainment: video games," "engineering," "books," "hobbies: beads," "hobbies: magic," and the like. Map engine 414 is configured to map data from site characterization data into the required fields and categories for each particular web site. Often, there will be a one-to-one correspondence between data fields of site characterization data and data fields of a particular search engine, even if the fields have different names. For instance, site characterization data may contain the name-value field "URL", which contains the actual URL of the web site. This may correspond to name-value field "web site address" for a particular search engine, as illustrated in FIG. 5. Thus, field "URL" would be mapped to field "web site address". Such a mapping means that the value stored with a particular named field is stored after being mapped in another named field to which the named field is mapped. As will be understood, the number of search engine data fields and categories need not be the same as the number of such fields and categories in the site characterization data.

As further illustrated in mapping 500 of FIG. 5, data field "contact information" is mapped to field "contact data," and so forth. Further, in one embodiment the site characterization data contains one selected category out of a pre-defined list of categories (or subcategories). If the search engine to be registered with also allows a category out of a pre-defined list of categories to be selected to describe the web site, mapping 500 maps each of the pre-defined list of categories of site characterization data into a corresponding category of the search engine. Thus, for example, as illustrated in mapping 500, category "companies/computers/rental" may be mapped to search engine category "electronics equipment rentals". Such a mapping means that if one web site characterization category has been selected to describe the web site, the corresponding search engine category is selected as describing the web site for the mapped web site characterization data.

As will be appreciated, mappings other than one-to-one (1:1) mappings may be provided. For example, a given site characterization data field may not have a corresponding search engine data field at all in a mapping. In this case, the value in the site characterization data field is discarded when registering with the search engine. This may be considered a 1:0 mapping. 2:1, 1:2 and other mappings may also be made. For example, a particular search engine may ask for two different telephone numbers. If both fields do not exist in the site characterization data field layout, then one telephone number value provided in the site characterization data field may be mapped to both search engine telephone number fields.

Registration

Once web site characterization data has been mapped into search engine 210 format, a registration engine 420, as described with respect to FIG. 4, may be invoked to register the web site of web server 232 with search engine 210. Registration engine registers in accordance with the method required by search engine 210, as described in the registration method data field 312 of database 222. For example, some search engines require registration by a user filling out an HTML form accessed from the search engine's web site, whereas some require registration by emailing a specially-formatted email message to the search engine at its email address.

As will be appreciated, search engines that require registration by HTML form are typically designed to allow a user to browse the search engine web site, download the HTML form, and fill in registration data about the web site in various pre-defined fields. This form is then posted by the user back to the search engine, typically in the form of name-value pairs, where it is received by the search engine, to register the web site. To perform automated registration, registration engine 420 mimics this behavior, by requesting the HTML form, filling in data appropriately in accordance with the relevant mapping, and posting this form back to the search engine. Thus, registration user, in one embodiment, simulates the actions that would be taken by a browsing user 250. Alternatively, instead of actually taking the step of requesting an HTML form, registration engine 420 may create an appropriately filled out HTML form in accordance with the relevant mapping data, and post this form back to the search engine.

Other search engines may require registration by way of a specially-formatted email message. In this case, registration engine 420 prepares an email message containing the appropriately mapped an formatted site characterization data and transmits it to the search engine. As will be appreciated, a separate "job" may be invoked for each such registration, and different sub-engines may be invoked to handle jobs of different types. Each engine may utilize a dynamic-linked library ("DLL") designed to perform a particular type of registration. In addition to HTML and email registration, other types of registration, such as manual registration, could be performed. For instance, a search engine may allow or require the receipt of a printed page of text formatted in a specific manner, so that a data entry clerk can manually perform the registration, with human supervision. Alternatively, a search engine may require registration data to be faxed to the search engine.

Thus, with the present invention, a user may register its web site with any number of search engines by calling search engine registration server 221 and providing site characterization data one time. This data is then stored, and may be used by registration server 221 to map this data into the required formats for any number of search engines, and to automatically register with each of these search engines. As new search engines are added to database 222, the web site may be automatically registered to each of these search engines without the user being required to enter further data. If the user needs to make some changes in the registration information concerning the web site, the change may be made one time to the existing site characterization data stored in database 222, and registration server can automatically re-register with search engines, or update such information, without the user having to update each search engine manually.

In one embodiment of the present invention, the user is able to select which search engines of a master list of available search engines that he can register his web site with. Then, after each search engine has been successfully contacted and the web site registered, registration server 221 notifies the user that registration has been completed. Alternatively, the user may be notified only after registration is completed for all of the selected search engines, or only of failed attempts. Registration server 221 may also record related data during the registration purpose, for diagnostic and other purposes, such as the time registration starts and is completed for each search engine. During the registration process, user 250 may contact registration server 221 directly to check on the status of the registration process.

Although medium 101 is described above as being a network such as the Internet, in alternative embodiments, medium 101 may be a communication channel such as an Integrated Services Digital Network ("ISDN") or other type of network. Further, in alternative embodiments some nodes of a networked computer system may also be connected through a other forms of communication media, including a local area network ("LANs"), plain-old telephone lines ("POTS"), sometimes referred to as public switched telephone networks ("PSTN"), and the like. Additionally, where search engines 210, 211 are intercoupled through the Internet to PCs 220, 230, in an alternative embodiment, PCs 220 and 230 may be coupled to each other via another medium such as a LAN.

Although web server 232 and the web site it provides, as well as client 231, are described as being hosted by the same machine (PC 230), in alternative embodiments web server 232 and client 231 are hosted by different machines.

In a further embodiment, each search engine characterization data field in database 222, which describes a particular search engine, may store restriction data for each search engine. For example, some search engines may be designed for or may be restricted to web sites only from the state of Oregon, or to adults only. Thus, if the web site does not satisfy this restriction and user 250 has selected "all possible" search engines in database 222 to have the web site registered with, then, in one embodiment, registration server 221 would not register the web site with such search engines. Other types of restrictions may also be used, such as a list of restrictions, where one and only one should be true before registration on the search engine will be allowed.

An embodiment of the present invention has been described above related to the registration of web sites with search engines. As will be appreciated, in alternative embodiments, the mapping and automatic registration of the present invention may be advantageously employed in other contexts as well. For example, the web site may be considered to be a specific instance of the more general case of a first application or entity describable by first application characteristic data. This first application may need to be "registered" with a number of task applications, including search engines. Each of these task applications, in general, is designed to perform certain useful tasks, and each can require the registration of one or more applications of the first application type. As described above with respect to search engines, where the task applications are of a common type, such that they perform similar functions and/or require some common types of data for registration purposes, it is possible to have one set of first application data, which is mappable into each of the task application's registration formats.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for registering a web site with a plurality of search engines, the method comprising the steps of:
    (a) providing a set of web site characterization data comprising a plurality of data fields and at least one web site description category of a plurality of web site description categories;
    (b) storing, in a database, map data describing how to map data in the plurality of data fields into a corresponding plurality of data fields for each of the plurality of search engines and how to map the plurality of web site description categories into a corresponding plurality of web site description categories for each of the plurality of search engines;
    (c) mapping, in accordance with the map data, the set of web site characterization data into a mapped set of web site data for each of the plurality of search endlines;
    (d) storing, in the database, registration method data for describing a method of registering a web site for each of the plurality of search engines; and
    (e) registering the web site with each of the plurality of search engines by transmitting, in accordance with the registration method data for each search engine, respectively, the mapped set of web site data for said each search engine to each search engine, respectively.

2. The method of claim 1, wherein the web site and the search engines are interconnected through the world wide web running on the Internet.

3. The method of claim 1, wherein the registration method data describes registering with each search engine of the plurality of search engines by at least one of: posting a completed HTML form containing the mapped set of web site data to said each search engine, transmitting a formatted email message containing the mapped set of web site data to said each search engine, and mailing an application form containing the mapped set of web site data to said each search engine.

4. The method of claim 1, further comprising the steps of:
    (f) storing the set of web site characterization data in the database; and
    (g) storing the mapped set of web site data for each of the plurality of search engines in the database.

5. The method of claim 1, further comprising the steps of:
    (f) providing, with a registration server, a web site characterization data HTML form to a registration client application;
    (g) entering data in the web site characterization data HTML form; and
    (h) transmitting the web site characterization data HTML form to provide the set of web site characterization data in step (a).

6. An apparatus for registering a web site with a plurality of search engines, the apparatus comprising:
    (a) means for providing a set of web site characterization data comprising a plurality of data fields and at least one web site description category of a plurality of web site description categories;
    (b) means for storing, in a database, map data describing how to map data in the plurality of data fields into a corresponding plurality of data fields for each of the plurality of search engines and how to map the plurality of web site description categories into a corresponding plurality of web site description categories for each of the plurality of search engines;

(c) means for mapping, in accordance with the map data, the set of web site characterization data into a mapped set of web site data for each of the plurality of search engines;

(d) means for storing, in the database, registration method data for describing a method of registering a web site for each of the plurality of search engines; and (e) means for registering the web site with each of the plurality of search engines by transmitting, in accordance with the registration method data for each search engine, respectively the mapped set of web site data for said each search engine to each search engine, respectively.

7. The apparatus of claim 6, wherein the web site and the search engines are interconnected through the world wide web running on the Internet.

8. The apparatus of claim 6, wherein the registration method data describes registering with each search engine of the plurality of search engines by at least one of: posting a completed HTML form containing the mapped set of web site data to said each search engine, transmitting a formatted email message containing the mapped set of web site data to said each search engine, and mailing an application form containing the mapped set of web site data to said each search engine.

9. The apparatus of claim 6, further comprising:

(f) means for storing the set of web site characterization data in the database; and (g) means for storing the mapped set of web site data for each of the plurality of search engines in the database.

10. The apparatus of claim 6, further comprising:

(f) means for providing, with a registration server, a web site characterization data HTML form to a registration client application;

(g) means for entering data in the web site characterization data HTML form; and (h) means for transmitting the web site characterization data HTML form to provide the set of web site characterization data.

11. A computer-readable medium having stored thereon a plurality of instructions for registering a web site with a plurality of search engines, wherein the plurality of instructions, when executed by a processor, cause the processor to perform the steps of:

(a) providing a set of web site characterization data comprising a plurality of data fields and at least one web site description category of a plurality of web site description categories;

(b) storing, in a database, map data describing how to map data in the plurality of data fields into a corresponding plurality of data fields for each of the plurality of search engines and how to map the plurality of web site description categories into a corresponding plurality of web site description categories for each of the plurality of search engines;

(c) mapping, in accordance with the map data, the set of web site characterization data into a mapped set of web site data for each of the plurality of search engines;

(d) storing, in the database, registration method data for describing a method of registering a web site for each of the plurality of search engines; and (e) registering the web site with each of the plurality of search engines by transmitting, in accordance with the registration method data for each search engine, respectively, the mapped set of web site data for said each search engine to each search engine, respectively.

12. The computer-readable medium of claim 11, wherein the web site and the search engines are interconnected through the world wide web running on the Internet.

13. The computer-readable medium of claim 11, wherein the registration method data describes registering with each search engine of the plurality of search engines by at least one of: posting a completed HTML form containing the mapped set of web site data to said each search engine, transmitting a formatted email message containing the mapped set of web site data to said each search engine, and mailing an application form containing the mapped set of web site data to said each search engine.

14. The computer-readable medium of claim 11, wherein the plurality of instructions causes the processor to perform the further steps of:

(f) storing the set of web site characterization data in the database; and (g) storing the mapped set of web site data for each of the plurality of search engines in the database.

15. The computer-readable medium of claim 11, wherein the plurality of instructions causes the processor to perform the further steps of:

(f) providing, with a registration server, a web site characterization data HTML form to a registration client application;

(g) entering data in the web site characterization data HTML form; and (h) transmitting the web site characterization data HTML form to provide the set of web site characterization data in step (a).

16. An apparatus for registering a web site with a plurality of search engines, the apparatus comprising:

(a) a registration engine; and (b) a database storing a set of web site characterization data comprising a plurality of data fields and at least one web site description category of a plurality of web site description categories and map data describing how to map data in the plurality of data fields into a corresponding plurality of data fields for each of the plurality of search engines and describing how to map the plurality of web site description categories into a corresponding plurality of web site description categories for each of the plurality of search engines; wherein:

the registration engine is configured to map, in accordance with the map data, the set of web site characterization data into a mapped set of web site data for each of the plurality of search engines;

registration method data for describing a method of registering a web site for each of the plurality of search engines is stored in the database; and the registration engine is configured to register the web site with each of the plurality of search engines by transmitting in accordance with the registration method data for each search engine, respectively, the mapped set of web site data for said each search engine to each search engine, respectively.

17. The apparatus of claim 16, wherein the web site and the search engines are interconnected through the world wide web running on the Internet.

18. The apparatus of claim 16, wherein the registration method data describes registering with each search engine of the plurality of search engines by at least one of: posting a completed HTML form containing the mapped set of web site data to said each search engine, transmitting a formatted email message containing the mapped set of web site data to said each search engine, and mailing an application form containing the mapped set of web site data to said each search engine.

19. The apparatus of claim 16, wherein:

the set of web site characterization data is stored in the database; and the mapped set of web site data is stored, for each of the plurality of search engines in the database.

20. The apparatus of claim 16, wherein:

a registration server provides a web site characterization data HTML form to a registration client application;

data is entered in the web site characterization data HTML form; and the web site characterization data HTML form is transmitted to provide the set of web site characterization data.

* * * * *